United States Patent
Shu

(10) Patent No.: US 12,332,766 B2
(45) Date of Patent: Jun. 17, 2025

(54) DEFINING FEATURE VARIABLE CONFIGURATIONS THAT ENABLE ACCESS TO FEATURES OF A SYSTEM

(71) Applicant: Salesforce, Inc., San Francisco, CA (US)

(72) Inventor: Gang Shu, San Francisco, CA (US)

(73) Assignee: Salesforce, Inc.

( * ) Notice: Subject to any disclaimer, the term of this patent is extended or adjusted under 35 U.S.C. 154(b) by 231 days.

(21) Appl. No.: 18/187,439

(22) Filed: Mar. 21, 2023

(65) Prior Publication Data
US 2024/0320126 A1 Sep. 26, 2024

(51) Int. Cl.
G06F 11/3668 (2025.01)
G06F 11/3604 (2025.01)

(52) U.S. Cl.
CPC ...... *G06F 11/3608* (2013.01); *G06F 11/3668* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

*Primary Examiner* — Jason D Mitchell
(74) *Attorney, Agent, or Firm* — Lorenz & Kopf, LLP

(57) ABSTRACT

A method and system for defining feature variable configurations in a system defined by a codebase has been developed. The codebase is executed over a set of test cases to test the software feature behaviors of a software feature. Feature variable configurations including feature variables generated by the test cases are logged. Associations between the feature variables and individual software feature behaviors are identified based on the logged feature variable configurations. Impact scores for the feature variables associated with individual software feature behaviors are calculated based on an occurrence of the associations between the feature variables and individual software feature behaviors. Deterministic feature variables are identified for individual software feature behaviors based on the calculated impact scores. At least one common feature variable is operable to enable access to the software feature in the system is identified from the deterministic features variables associated with the individual of software feature behaviors.

19 Claims, 9 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,454,706 B2 * | 10/2019 | Six .................. H04L 12/40169 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2020/0279182 A1 * | 9/2020 | So .................. G06N 20/00 |
| 2021/0073672 A1 * | 3/2021 | Shi .................. G06N 20/00 |
| 2021/0224184 A1 * | 7/2021 | Sanevelly ........... G06F 11/3684 |
| 2021/0377352 A1 * | 12/2021 | Rizvi .................. G06F 16/958 |
| 2022/0035730 A1 * | 2/2022 | Dundigalla ........... G06F 11/368 |
| 2022/0276952 A1 * | 9/2022 | Waldron ............. G06F 11/3438 |
| 2023/0095571 A1 * | 3/2023 | Williams ............ G06F 11/3636 |
| | | 717/108 |
| 2023/0176848 A1 * | 6/2023 | Nanduru .................. G06F 8/65 |
| | | 717/168 |
| 2023/0180019 A1 * | 6/2023 | Martin .................. H04W 24/02 |
| | | 455/446 |
| 2024/0028935 A1 * | 1/2024 | Dorle .................. G06N 20/00 |

* cited by examiner

```
<Platform License Definition>
    <Name: Function 1>
    <Cloud Provider: Provider A>
    <Description of Function A>

<Software Feature SF 1>
        <Feature Variable A>
        <Value> True <Value>

<Software Feature Behavior SFB 1>
        <Feature Variable B>
        <Value> True <Value>
        <Feature Variable C>
        <Value> True <Value>

<Software Feature Behavior SFB 2>
        <Feature Variable D>
        <Value> True <Value>
        <Feature Variable F>
        <Value> True <Value>

<Software Feature Behavior SFB 3>
        <Feature Variable G>
        <Value> True <Value>
        <Feature Variable H>
        <Value> True <Value>

Feature Limit
    <Software Feature Behavior SFB 3>
        <Value> 500 <Value>
```

FIG. 5

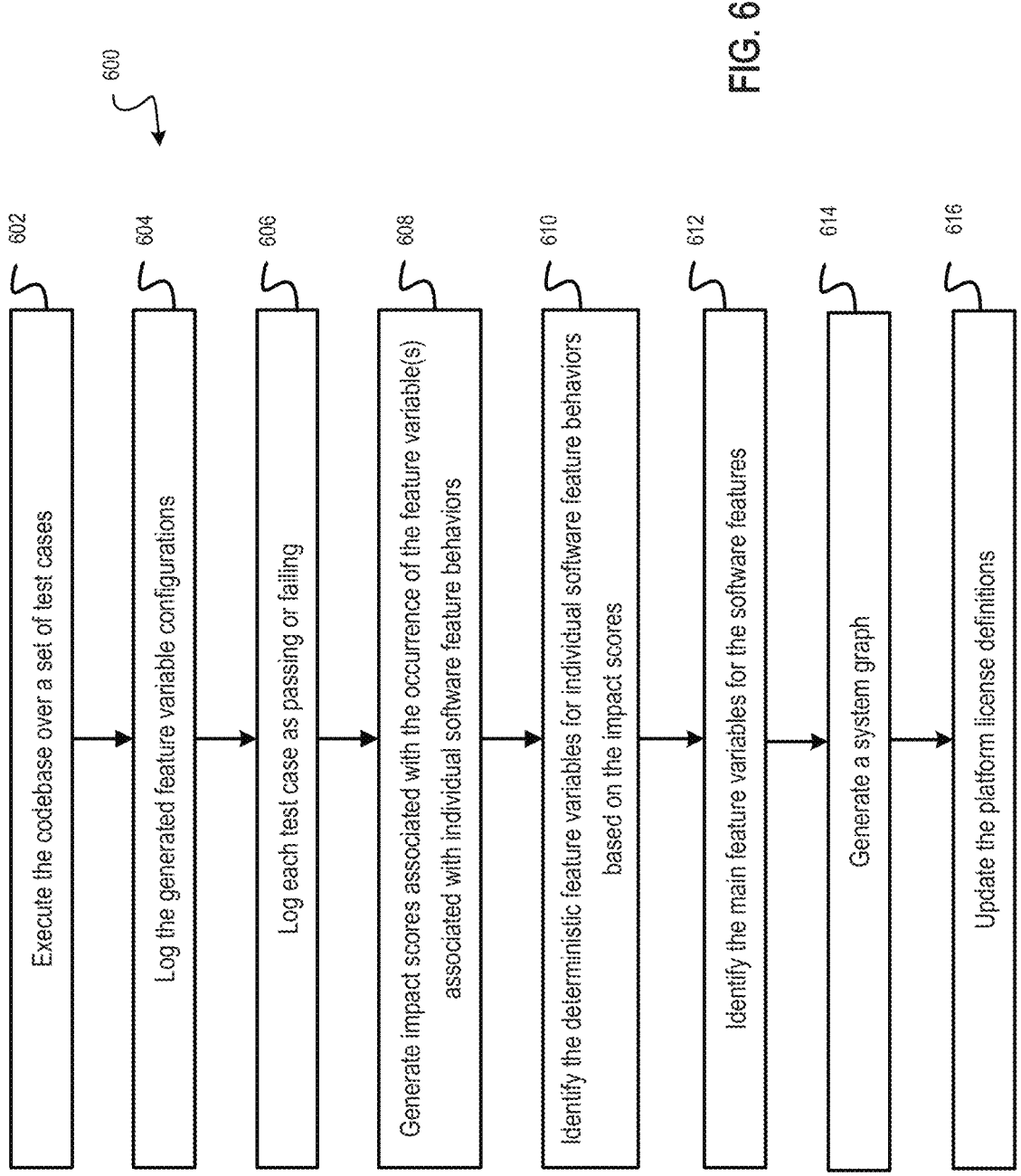

DEFINING FEATURE VARIABLE CONFIGURATIONS THAT ENABLE ACCESS TO FEATURES OF A SYSTEM

TECHNICAL FIELD

Embodiments of the subject matter described herein relate generally to system codebase management and more particularly, embodiments of the subject matter relate to systems and methods for defining feature variable configurations that enable access to features of a system.

BACKGROUND

A continuous integration/continuous deployment (CI/CD) pipeline introduces automation into different stages of application (also referred to as "system") development including the integration of software updates to the application. The CI/CD pipeline is supported by software developers and enables continuous automation and monitoring throughout the lifecycle of the application from integration and testing phases to delivery and deployment.

An application or system can be defined by a large complex monolithic codebase. The system can include numerous software features. Each software feature typically includes a plurality of software feature behaviors. Access to each software feature behavior is controlled by a feature variable configuration. Feature variable configurations define flow relationships between feature variables that are used to access different software feature behaviors. A flow relationship can be a control flow relationship or a data flow relationship. Boolean feature variables define control flow relationships and numeric feature variables define data flow relationships. Access to a software feature is controlled by a main feature variable configuration that is common to the feature variable configurations associated with the software feature behaviors of that software feature.

In many instances there can be thousands of Boolean feature variables and thousands of numeric feature variables that define complex dependencies within a large monolithic codebase. In cases where rapid code changes to the codebase are implemented by software developers to accommodate the evolution of different software feature requirements within the system, the dependencies between feature variables and software feature behaviors can change over time.

Platform license definitions define feature variable configurations that enable access to different software features and associated software feature behaviors of a system. Changes in dependencies between feature variables and software feature behaviors can impact the feature variable configurations that enable access to software features and associated software feature behaviors in platform license definitions.

Accordingly, there is a need in the art for a method and system for defining feature variable configurations that enable access to software features of a system. Furthermore, there is a need in the art for a method and system for updating platform license definitions in accordance with changes in feature variable configurations that enable access to the software features and associated software feature behaviors included in platform license definitions.

BRIEF DESCRIPTION OF THE DRAWINGS

The present disclosure will hereinafter be described in conjunction with the following drawing figures, wherein like numerals denote like elements, and wherein:

FIG. 5 is an illustration of an exemplary platform license definition in accordance with at least one embodiment;

FIG. 6 is a flowchart representation of an exemplary method of defining feature variable configurations in a system in accordance with at least one embodiment;

DETAILED DESCRIPTION

An application or system is defined by a codebase. The system includes a plurality of software features. Each software feature includes a plurality of software feature behaviors. Access to each software feature behavior is controlled by a feature variable configuration. Feature variable configurations define flow relationships between deterministic feature variables that are used to access different software feature behaviors. The flow relationship can be a control flow relationship or a data flow relationship. Boolean feature variables define control flow relationships and numeric feature variables define data flow relationships. Access to a software feature is controlled by a main feature variable configuration that is common to the feature variable configurations associated with the software feature behaviors of that software feature.

Figure 1:
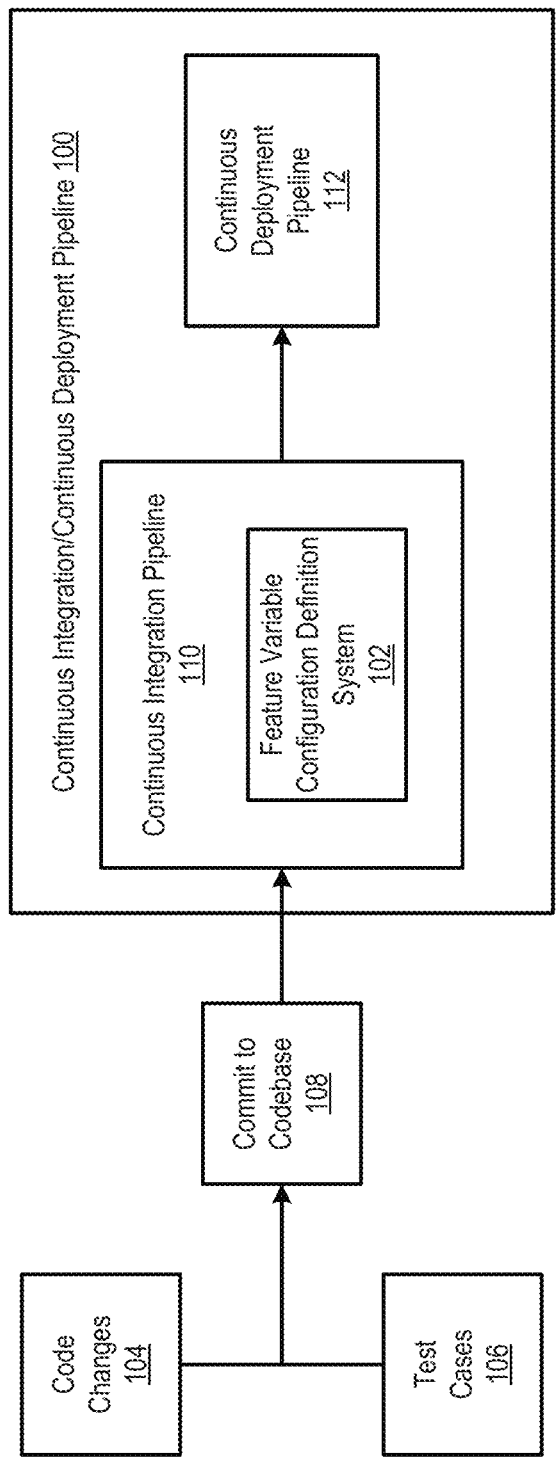
FIG. 1 is a block diagram representation of a continuous integration/continuous delivery (CI/CD) pipeline including a feature variable configuration definition system in accordance with at least one embodiment.

Referring to FIG. 1, a block diagram representation of a continuous integration/continuous delivery (CI/CD) pipeline 100 including a feature variable configuration definition system 102 in accordance with at least one embodiment is shown. It should be appreciated that FIG. 1 depicts a simplified representation of the CI/CD pipeline 100 for purposes of explanation and is not intended to be limiting. Code changes 104 are coded by software developers for introduction into a codebase. Code changes to the codebase are tested prior to merging the code changes into the codebase and releasing the codebase including the code changes to end users, such as for example customers.

The software developers create a set of test cases 106 to test the code changes 104. The set of test cases can include over a million test cases. Each test case is designed to test a single software feature behavior in the codebase. The code changes 104 are committed to the codebase 108 and the test cases are categorized prior to introduction into the CI/CD pipeline 100. The CI/CD pipeline 100 introduces automation into the different stages of application development including the integration of software updates in the form of code changes to the codebase. The CI/CD pipeline 100 is supported by the software developers and enables continuous automation and monitoring throughout the lifecycle of the application from integration and testing phases to delivery and deployment.

The CI/CD pipeline 100 includes a continuous integration pipeline 110 and a continuous development pipeline 112. The continuous integration pipeline 110 includes the feature variable configuration definition system 102. The continuous integration pipeline 110 may include additional components that facilitate operation of the continuous integration pipeline 110. The feature variable configuration definition system 102 may be distributed across both the continuous integration pipeline 110 and the continuous development pipeline 112.

When software developers introduce code changes into the codebase, the code changes can impact the feature variable configurations that are used to access different software behaviors of different software features and the main feature variable configurations used to access the different software features of the system. The feature variable configuration definition system 102 is configured to execute the codebase including the code changes over the set of test cases and identify the feature variable configurations that are used to access the software feature behaviors in the system and the common feature variables (also referred to as main feature variable) used to access the software features of the system. The operation of various embodiments of the feature variable configuration definition system 102 will be described in greater detail with reference to FIG. 2-FIG. 5 below. The codebase including the code changes enters the continuous deployment pipeline 112 following the testing and integration of the code changes into the codebase in the continuous integration pipeline 110. The continuous deployment pipeline 112 implements a review, staging, and production process prior to release of the codebase including the code changes to end users.

Figure 2:
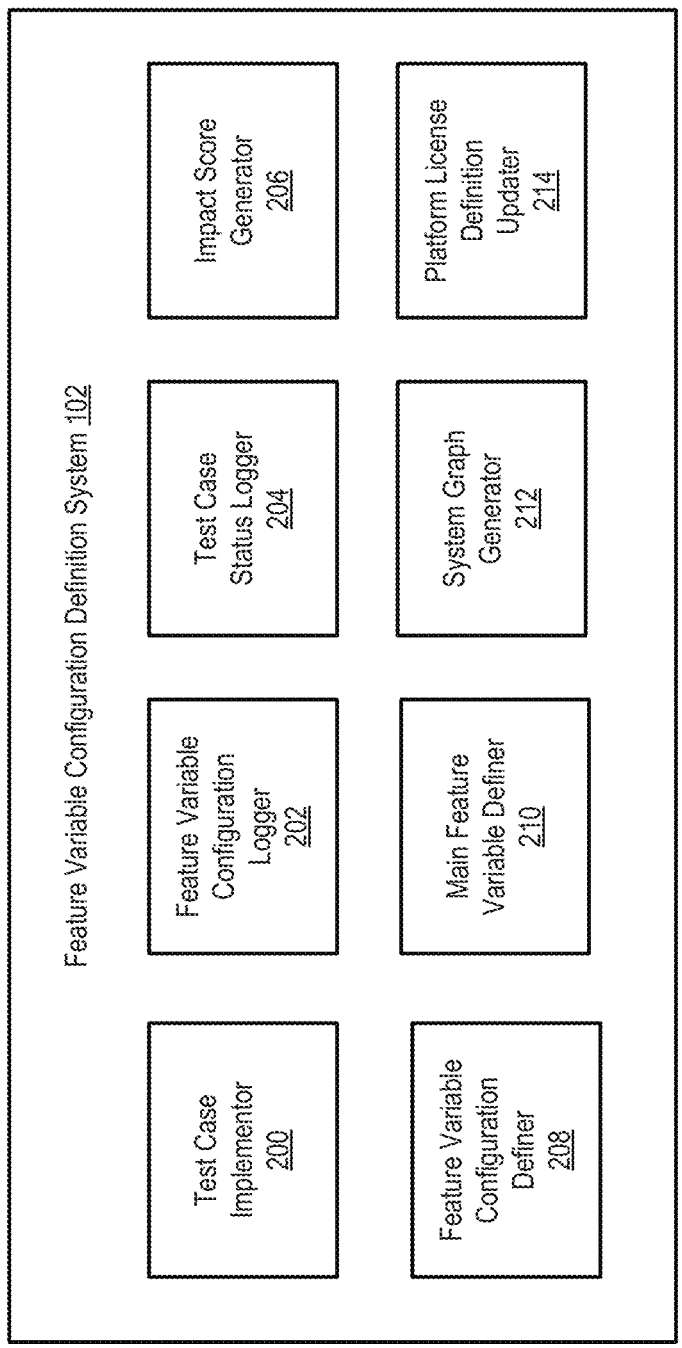
FIG. 2 is a block diagram representation of a feature variable configuration definition system in accordance with at least one embodiment.

Referring to FIG. 2, a block diagram representation of a feature variable configuration definition system 102 in accordance with at least one embodiment is shown. It should be appreciated that FIG. 2 depicts a simplified representation of the feature variable configuration definition system 102 for purposes of explanation and is not intended to be limiting. The feature variable configuration definition system 102 is configured to be implemented in a multi-tenant Software as a Service (SaaS) platform in certain embodiments. The feature variable configuration definition system 102 is a component of a CI/CD pipeline 100 in certain embodiments.

In various embodiments, the feature variable configuration definition system 102 includes a test case implementor 200, a feature variable configuration logger 202, a test case status logger 204, an impact score generator 206, a feature variable configuration definer 208, a main feature variable definer 210, a system graph generator 212, and a platform license definition updater 214. The feature variable configuration definition system 102 may include additional components that facilitate operation of the feature variable configuration definition system 102.

In certain embodiments, the feature variable configuration definition system 102 in includes at least one processor. The test case implementor 200, the feature variable configuration logger 202, the test case status logger 204, the impact score generator 206, the feature variable configuration definer 208, the main feature variable definer 210, the system graph generator 212, and the platform license definition updater 214 are stored in at least one memory. The at least one processor executes instructions stored in the at least one memory to implement operation of the feature variable configuration definition system 102.

The test case implementor 200 is configured to receive the codebase including the code changes that have been committed to the codebase and the categorized set of test cases. Each test case in the set of test cases is designed to test a software feature behavior in the codebase. A set of test cases can include over a million test cases. The test case implementor 200 is configured to execute the codebase including the code changes over the set of test cases.

Code changes to the codebase may alter the dependencies between feature variables and software feature behaviors in the system. The feature variable configuration logger 202 is configured to log the feature variable configurations generated by the execution of the codebase including the code changes over the test cases. Each test case in the set of test cases is designed to test a specific software feature behavior in the codebase. Upon the execution of the codebase, a test case associated with a specific software feature behavior generates a feature variable configuration for that software feature behavior. Each logged feature variable configuration includes one or more feature variables and the flow relationships associated with the one or more feature variables. The flow relationship can be a control flow relationship or a data flow relationship. Boolean feature variables define control flow relationships and numeric feature variables define data flow relationships.

For example, prior to the integration of the code changes into the code database, a feature variable configuration of A and B may have enabled access to software feature behavior SFB 1 in the system. The feature variables in the example are A, B. The feature variables A, B are Boolean feature variables. The value of A has to be true, and the value of B has to be true to access the software feature behavior SFB 1 prior to the integration of the code changes into the codebase.

In the example, following the execution of the codebase including the code changes over the set of test cases in including Test Case 1 and Test Case 2, where Test Case 1 and Test Case 2 are associated with the software feature behavior SFB 1, the feature variable configuration logger 202 logged the feature variables A, C as true in connection with software feature behavior SFB 1 as generated by Test Case 1 during the execution of the codebase including the code changes. The feature variable configuration logger 202 logged the feature variables A, B as being true in connection with software feature behavior SFB 1 as generated by Test Case 2 during the execution of the codebase including the code changes. Table 1 below summarizes the feature variables logged in connection with Test Case 1 and Test Case 2 for software feature behavior SFB 1. It should be appreciated that the example depicts two test cases associated with a single software feature behavior for purposes of explanation and is not intended to be limiting.

TABLE 1

Example Feature Variable Configuration Log

|  | Feature Variable A | Feature Variable B | Feature Variable C |
|---|---|---|---|
| Test Case 1 | T | F | T |
| Test Case 2 | T | T | F |

The test case status logger 204 is configured to log the status of each of the test cases in the set of test cases as passing or failing. The impact score generator 206 is configured to receive the feature variable configurations logged by the feature variable configuration logger 202 for the test cases associated with the different software feature behaviors. The impact score generator 206 is configured to generate impact scores for each of the feature variables associated with a software feature behavior.

In certain embodiments, the impact score generator 206 is configured to use a percentage model to generate the impact scores. For example, referring back to Table 1, the impact score generator 206 may generate impact scores for the feature variables A, B, C in connection with the software feature behavior SFB 1. Since the feature variable A is always true, the feature variable A has an impact score of 100%. Since the feature variable B is true in one of the two tests cases, the impact score for the feature variable B is 50%. Since the feature variable C is true in one of the two tests cases, the impact score of the feature variable C is 50%.

In certain embodiments, the impact score generator 206 is configured to use a statistical probability model, such as for example, a Bayes' theorem model to generate the impact scores. The statistical probability model is configured to receive the feature variable configurations logged by the feature variable configuration logger 202 for the test cases associated with the different software feature behaviors and generate impact scores for each of the feature variables associated with a software feature behavior.

When A is defined as an indication of whether or not a software feature behavior has been executed in the codebase over the test cases and B is defined as an indication of whether or not a feature variable has been evaluated during the test execution, the impact score for the feature variable associated with the software feature behavior can be generated using the Bayes' theorem model as shown below.

$$\text{Probability } (A \mid B) = \frac{\text{Probability } (B \mid A) \text{ Probability } (A)}{\text{Probability } (B)}$$

In certain embodiments, the impact score generator 206 is configured to use a linear regression model to generate the impact scores. The linear regression model is configured to receive the feature variable configurations logged by the feature variable configuration logger 202 for the test cases associated with the different software feature behaviors and generate impact scores for each of the feature variables associated with a software feature behavior. Examples of linear regression models include, but are not limited to, a simple linear regression model, a multiple linear regression model, a polynomial regression model, a logistic regression model, a ridge regression model, a least absolute shrinkage and selection operator (LASSO) regression model, a Bayesian linear regression model, a decision tree regression model, and a random forest regression model. Regression models typically have lower confounding bias when compared to the confounding bias associated with computing the impact scores using a simple probability model. In alternative embodiments, the impact score generator 206 may implement other types of causal inference methods such as for example inverse probability weighting or matching to generate the impact scores.

The feature variable configuration definer 208 is configured to receive the impact scores associated with the feature variables for the different software feature behaviors from the impact score generator 206. The feature variable configuration definer 208 is configured to compare the impact scores for each of the feature variables for a software feature behavior to an impact score threshold.

In certain embodiments, if the feature variable configuration definer 208 determines that an impact score for a feature variable associated with a software feature behavior is greater than the impact score threshold, the feature variable configuration definer 208 is configured to define that feature variable as a deterministic feature variable with respect to that software feature behavior. In certain embodiments, if feature variable configuration definer 208 determines that an impact score for a feature variable associated with a software feature behavior is equal to or greater than the impact score threshold, the feature variable configuration definer 208 is configured to define that feature variable as a deterministic feature variable with respect to that software feature behavior. The feature variable configuration definer 208 is configured to define the deterministic feature variables for each of the software feature behaviors tested by the set of test case.

For example, referring back to Table 1, the feature variable configuration definer 208 compares the impact scores for each of the logged feature variables A, B, C for software feature behavior SFB/to an impact score threshold of 50% to identify the deterministic feature variables for the software feature behavior SFB 1. The feature variable configuration definer 208 identifies the feature variables that have an impact score of greater than or equal to 50% as deterministic feature variables. The feature variable configuration definer 208 identifies the feature variables A, B, C as deterministic feature variables with respect to the software feature behavior SFB 1.

In the example, the feature variable configuration definer 208 defines the feature variable configuration using the control flow relationships associated with the deterministic feature variables A, B, C as the feature variable configuration A and B or C. The feature variable configuration definer 208 defines the feature variable configuration A and B or C as the feature variable configuration that will enable access to the software feature behavior SFB 1. As can be seen in the example, the feature variable configuration that enables access to software feature behavior SFB 1 has changed from A and B to A and B or C as a result of the code changes to the codebase.

The codebase includes a plurality of software features. Each software feature includes a plurality of software feature behaviors. The feature variable configurations generated by the feature variable configuration definer 208 define the feature variable configurations that will enable access to the software feature behaviors. Each of the feature variable configurations includes the deterministic feature variables for the associated software feature behavior. The main feature variable definer 210 is configured to identify a main feature variable that will enable access to software features. The main feature variable definer 210 is configured to identify the deterministic feature variables for each of the software feature behaviors associated with a software feature. The main feature variable definer 210 is configured to identify a common feature variable from the deterministic feature variables for the software feature behaviors associated with that software feature. In other words, all of the software feature behaviors associated with the software feature have the common feature variable as one of their deterministic feature variables. The main feature variable definer 210 is configured to define the common feature variable as a main feature variable that will enable access to the software feature.

Figure 3:
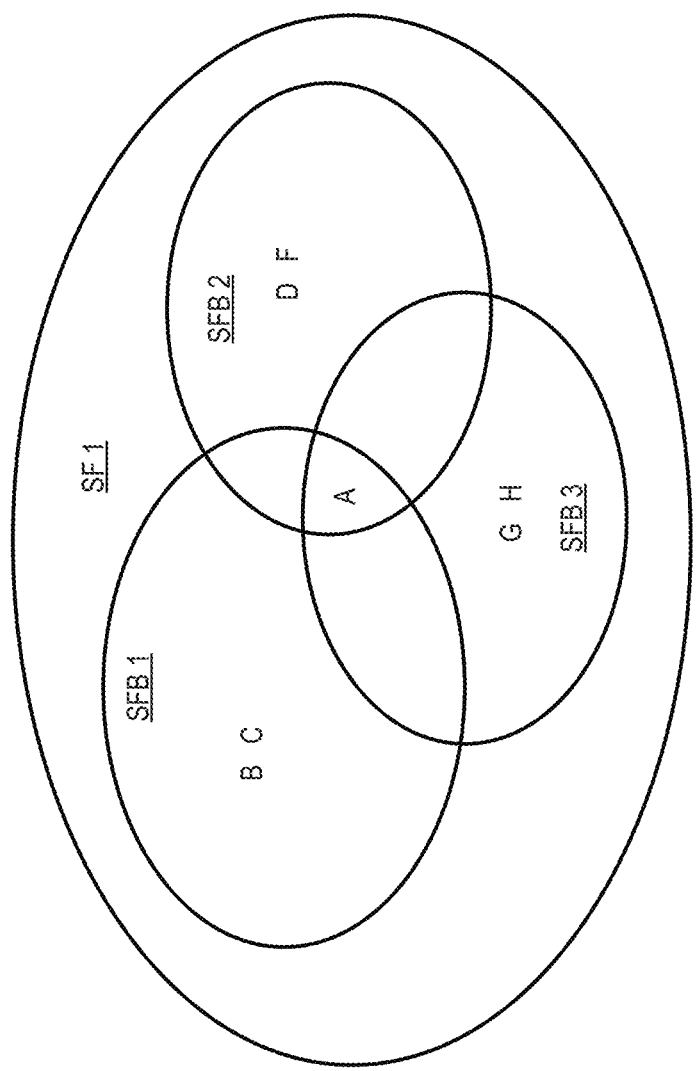
FIG. 3 is an illustration of an exemplary software feature including three different software feature behaviors in accordance with at least one embodiment.

Referring to FIG. 3, an illustration of an exemplary software feature SF/including three different software feature behaviors SFB 1, SBF 2, SFB 3 in accordance with at least one embodiment is shown. The main feature variable definer 210 identified the feature variables A, B, C as the deterministic feature variables for the software feature behavior SFB 1, identified the feature variables A, D, F as the deterministic feature variables for the software feature behavior SFB 2, and identified the feature variables A, G, H as the deterministic feature variables for the software feature behavior SFB 3. The main feature variable definer 210 identified the deterministic feature variable A as the common feature variable. All of the software features behaviors SFB 1, SFB, 2, SFB 3 associated with the software feature SF 1 have the common feature variable A as one of their deterministic feature variables. The main feature variable definer 210 defined the common feature variable A as the main feature variable that has to be true to enable access to the software feature SF 1. It should be appreciated that the example depicts a software feature including three different software feature behaviors for purposes of explanation and is not intended to be limiting.

Referring back to FIG. 2, the system graph generator 212 is configured to generate a system graph of the system as defined by the codebase including the code changes. The system graph reflects the boundaries of the software features in the system and the dependencies between the deterministic feature variables of the system as defined by the codebase including the code changes. Access to each software feature behavior is based on the deterministic feature variables associated with that software feature behavior. Each software feature includes a plurality of software feature behaviors. The deterministic feature variables of the software feature behaviors of a software feature are the deterministic feature variables associated with that software feature.

The boundary of a software feature in the system graph includes all of the deterministic feature variables associated with the software feature behaviors of that software feature. In certain embodiments, the deterministic feature variables associated with a software feature are represented as nodes within a software feature boundary in the system graph. The flow relationships between the deterministic features were logged by the feature variable configuration logger 202. In certain embodiments, the logged flow relationships between the deterministic feature variables are represented as arrows between the nodes that represent the deterministic feature variables. A single deterministic feature variable can belong to multiple software features. In certain embodiments, the system graph is stored in a database. The system retrieved from the database and updated. The updated system graph is stored in the database.

Figure 4:
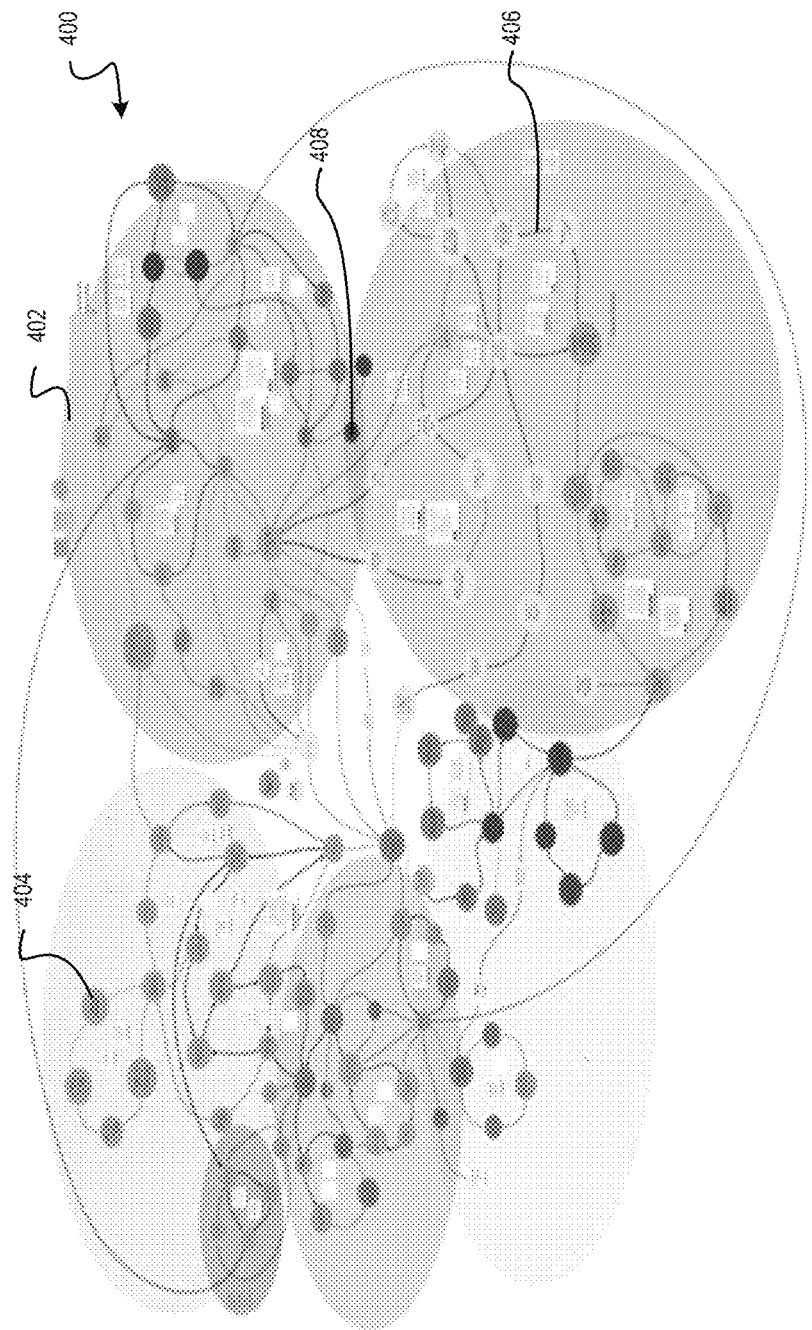
FIG. 4 is an illustration of an exemplary system graph of system as defined by the codebase including the code changes in accordance with at least one embodiment.

Referring to FIG. 4, an illustration of an exemplary system graph 400 of system as defined by a codebase including the code changes in accordance with at least one embodiment is shown. Each oval 402 in the system graph defines a boundary of a software feature. The system graph 400 includes six ovals 402 indicating that the system includes six software features. It should be appreciated that the example depicts a system including six software features for purposes of explanation and is not intended to be limiting.

Each node 404 in the system graph 400 represents a deterministic feature variable in the codebase. Each of the ovals 402 that represent a software feature includes the deterministic feature variables of the software feature behaviors of that software feature. When there is a flow relationship dependency between two deterministic feature variables, an arrow 406 between those two deterministic feature variables is used to represent the flow relationship. The deterministic feature variable 408 is an example of a deterministic feature variable that is included in two different software features.

Referring back to FIG. 2, the platform license definition updater 214 is configured to update platform license definitions in accordance with the dependencies between the deterministic feature variables. A platform license definition grants access to one or more software features of the system. Each platform license definition defines the feature variable configurations that enable access to the software features covered by that platform license definition and the software feature behaviors associated with those software features. Changes in dependencies between feature variables and software feature behaviors as a result of code changes to the codebase can impact the feature variable configurations that enable access to the software features and associated software feature behaviors covered by individual platform license definitions.

Referring to FIG. 5, an exemplary platform license definition in accordance with at least one embodiment is shown. The illustrated platform definition license is for the software feature SF 1 and the three software feature behaviors SFB 1, SFB 2, SFB 3 shown in the example in FIG. 3. The platform license definition includes the name of the function Function A. The function Function A corresponds to the software feature SF 1. The cloud service provider for the function Function A is Provider A. A description of Function A is included in the platform license definition.

The platform license definition indicates that the main feature variable A is a Boolean feature variable that has to be true to enable access to the software feature SF 1. The platform license definition indicates that the software feature SF/include three software feature behaviors SFB 1. SFB 2, SFB 3. Each of the software feature behaviors SFB 1, SFB 2, SFB 3 correspond to a sub-function of the Function A. The platform license definition indicates that the deterministic feature variables B and C have to be true to enable access to the software feature behavior SFB 1, the deterministic feature variables D and F have to be true to enable access to the software feature behavior SFB 2, and the deterministic feature variables G and H have to be true to enable access to the software feature behavior SFB 3. The software feature behavior SFB 3 has a feature limit of 500. The feature limit of 500 is a numerical feature variable and defines the number of times an end user has access to a sub-function that corresponds to the software feature behavior SFB 3. In certain embodiments, the platform definitions licenses are stored in a database. The platform definition licenses are retrieved from the database and updated in accordance with the main feature variables for the software features and the dependencies between the deterministic feature variables of the software feature behaviors for the software features. The updated platform definition licenses are stored in the database.

While the operation of the feature variable configuration definition system 102 has been described with reference to a codebase that includes code changes, the feature variable configuration definition system 102 may be used to generate feature variable configurations for a new codebase.

Referring to FIG. 6, a flowchart representation of an exemplary method 600 of defining feature variable configurations in system in accordance with at least one embodiment is shown. The method 600 will be described with reference to an example implementation of the feature variable configuration definition system 102. As can be appreciated in light of the disclosure, the order of operation within the method 600 is not limited to the sequential execution as illustrated in FIG. 6 but may be performed in one or more varying orders as applicable and in accordance with the present disclosure.

At 602, a codebase is executed over a set of test cases. In certain embodiments, the codebase is a new codebase. In certain embodiments, the codebase is a codebase that includes code changes to an existing codebase. At 604, the feature variable configurations generated for software feature behaviors during the execution of the codebase over the set of test cases are logged. Each logged feature variable configuration includes one or more feature variables and the flow relationships between the one or more feature variables. At 606, each test case in the set of test case is logged as passing or failing. At 608, the impact scores associated with the occurrence of feature variables for the individual software feature behaviors are generated. At 610, the deterministic feature variables are identified for the individual software feature behaviors based on the impact scores. At 612, the main feature variables for the software features are identified. The main feature variable has a main feature variable configuration. For example, the main feature configuration may define that the main feature variable has to be true to enable access to the software feature. At 614, a system graph defining the boundaries of the software features in the system and reflecting the dependencies between the deterministic feature variables is generated. At 616, the platform license definitions are updated in accordance with the main feature variables for the software features and the dependencies between the deterministic feature variables of the software feature behaviors for the software features. In certain embodiments, the platform definitions licenses are stored in a database. The platform definition licenses are retrieved from the database and updated in accordance with the main feature variables for the software features and the dependencies between the deterministic feature variables of the software feature behaviors for the software features. The updated platform definition licenses are stored in the database.

Figure 7:
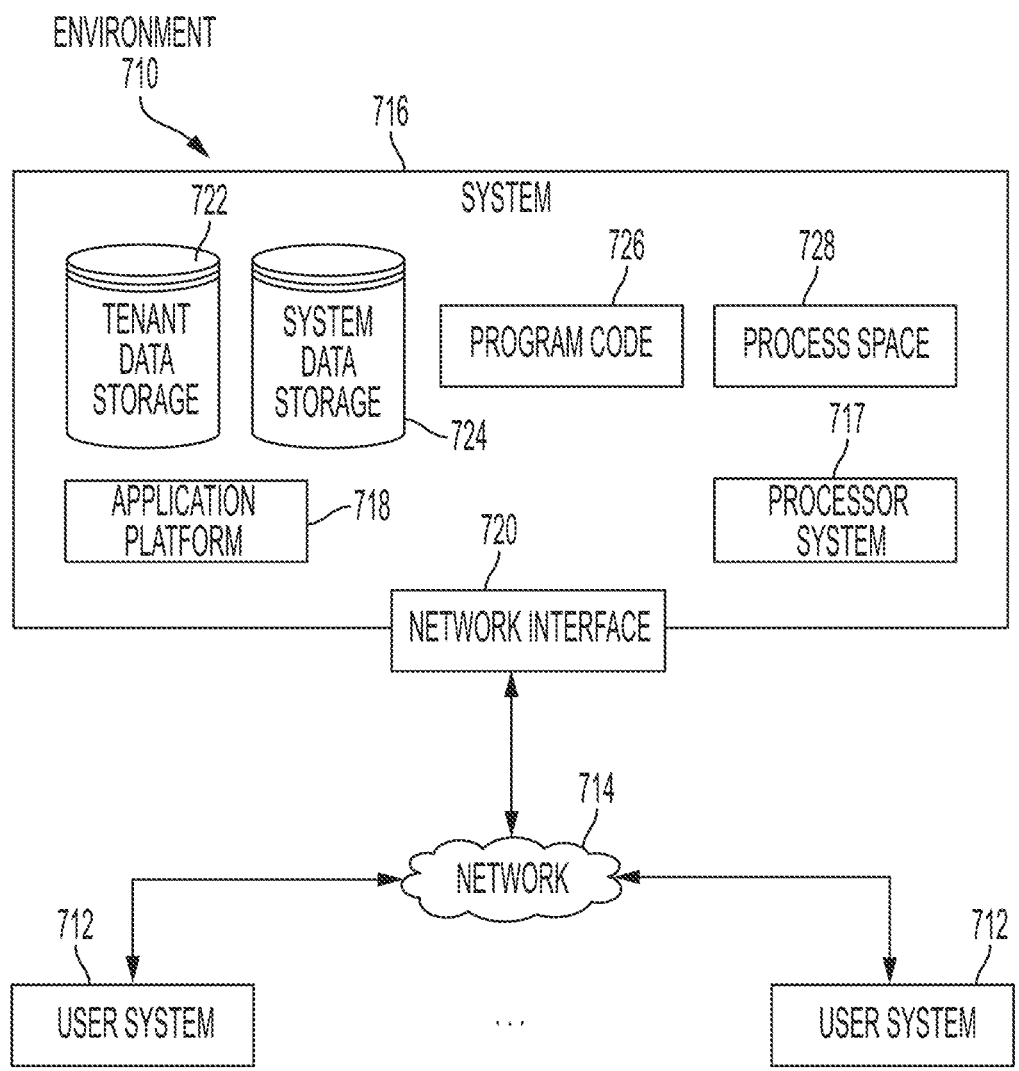
FIG. 7 is a block diagram representation of an example of an environment in which an on-demand database service can be used in accordance with some implementations.

FIG. 7 shows a block diagram of an example of an environment 710 in which an on-demand database service can be used in accordance with some implementations. The environment 710 includes user systems 712 (also referred to a client device), a network 714, a database system 716 (also referred to herein as a "cloud-based system"), a processor system 717, an application platform 718, a network interface 720, tenant database 722 for storing tenant data, system database 724 for storing system data, program code 726 for implementing various functions of the system 716, and process space 728 for executing database system processes and tenant-specific processes, such as running applications as part of an application hosting service. In some other implementations, environment 710 may not have all of these components or systems, or may have other components or systems instead of, or in addition to, those listed above.

In some implementations, the environment 710 is an environment in which an on-demand database service exists. An on-demand database service, such as that which can be implemented using the system 716, is a service that is made available to users outside of the enterprise(s) that own, maintain or provide access to the system 716. As described above, such users generally do not need to be concerned with building or maintaining the system 716. Instead, resources provided by the system 716 may be available for such users' use when the users need services provided by the system 716; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 718 can be a framework that allows the applications of system 716 to execute, such as the hardware or software infrastructure of the system 716. In some implementations, the application platform 718 enables the creation, management and execution of one or more applications developed by the provider of the on-demand database service, users accessing the on-demand database service via user systems 712, or third-party application users accessing the on-demand database service via user systems 712.

In some implementations, the system 716 implements a web-based customer relationship management (CRM) system. For example, in some such implementations, the system 716 includes application servers configured to implement and execute CRM software applications as well as provide related data, code, forms, renderable webpages and documents and other information to and from user systems 712 and to store to, and retrieve from, a database system related data, objects, and Webpage content. In some MTS implementations, data for multiple tenants may be stored in the same physical database object in tenant database 722. In some such implementations, tenant data is arranged in the storage medium(s) of tenant database 722 so that data of one tenant is kept logically separate from that of other tenants so that one tenant does not have access to another tenant's data, unless such data is expressly shared. The system 716 also implements applications other than, or in addition to, a CRM application. For example, the system 716 can provide tenant access to multiple hosted (standard and custom) applications, including a CRM application. User (or third-party user) applications, which may or may not include CRM, may be supported by the application platform 718. The application platform 718 manages the creation and storage of the applications into one or more database objects and the execution of the applications in one or more virtual machines in the process space of the system 716.

According to some implementations, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 714 can be or include any network or combination of networks of systems or devices that communicate with one another. For example, the network 714 can be or include any one or any combination of a LAN (local area network), WAN (wide area network), telephone network, wireless network, cellular network, point-to-point network, star network, token ring network, hub network, or other appropriate configuration. The network 714 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 712 can communicate with system 716 using TCP/IP and, at a higher network level, other common Internet protocols to communicate, such as HTTP, FTP, AFS, WAP, etc. In an example where HTTP is used, each user system 712 can include an HTTP client commonly referred to as a "web browser" or simply a "browser" for sending and receiving HTTP signals to and from an HTTP server of the system 716. Such an HTTP server can be implemented as the sole network interface 720 between the system 716 and the network 714, but other techniques can be used in addition to or instead of these techniques. In some implementations, the network interface 720 between the system 716 and the network 714 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 712 can be implemented as any computing device(s) or other data processing apparatus or systems usable by users to access the database system 716. For example, any of user systems 712 can be a desktop computer, a workstation, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 712 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 716) of the user system 712 to access, process and view information, pages and applications available to it from the system 716 over the network 714.

Each user system 712 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 712 in conjunction with pages, forms, applications and other information provided by the system 716 or other systems or servers. For example, the user interface device can be used to access data and applications hosted by system 716, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 712 may differ in their respective capacities, and the capacity of a particular user system 712 can be entirely determined by permissions (permission levels) for the current user of such user system. For example, where a salesperson is using a particular user system 712 to interact with the system 716, that user system can have the capacities allotted to the salesperson. However, while an administrator is using that user system 712 to interact with the system 716, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 712 and some or all of its components are operator-configurable using applications, such as a browser, including computer code executed using a central processing unit (CPU) such as an Intel Pentium® processor or the like. Similarly, the system 716 (and additional instances of an MTS, where more than one is present) and all of its components can be operator-configurable using application(s) including computer code to run using the processor system 717, which may be implemented to include a CPU, which may include an Intel Pentium® processor or the like, or multiple CPUs.

The system 716 includes tangible computer-readable media having non-transitory instructions stored thereon/in that are executable by or used to program a server or other computing system (or collection of such servers or computing systems) to perform some of the implementation of processes described herein. For example, computer program code 726 can implement instructions for operating and configuring the system 716 to intercommunicate and to process webpages, applications and other data and media content as described herein. In some implementations, the computer code 726 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

Figure 8:
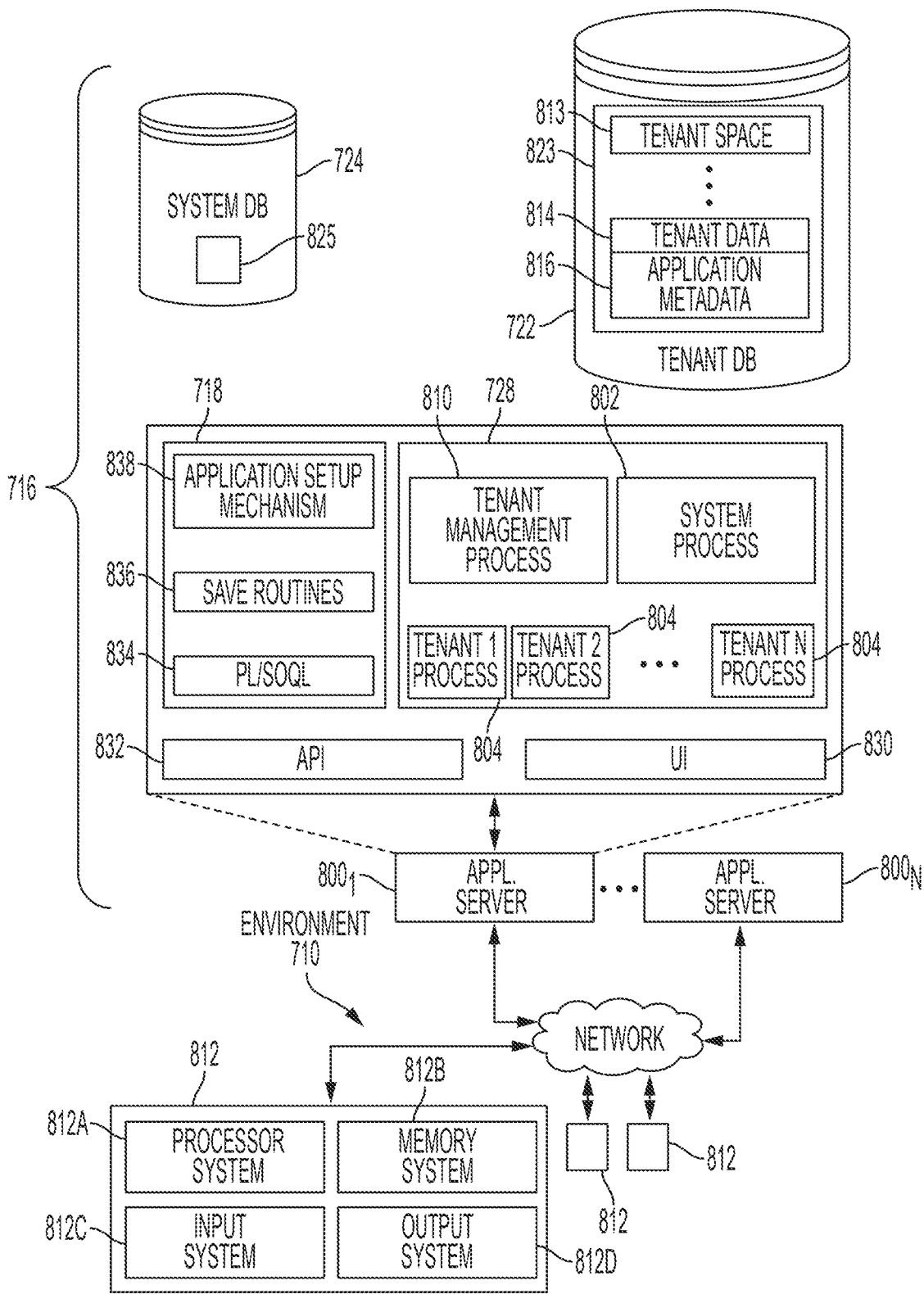
FIG. 8 is a block diagram representation of example implementations of elements of FIG. 7 and example interconnections between these elements according to some implementations.

FIG. 8 shows a block diagram of example implementations of elements of FIG. 7 and example interconnections between these elements according to some implementations. That is, FIG. 8 also illustrates environment 710, but FIG. 8, various elements of the system 716 and various interconnections between such elements are shown with more specificity according to some more specific implementations. Elements from FIG. 7 that are also shown in FIG. 8 will use the same reference numbers in FIG. 8 as were used in FIG. 7. Additionally, in FIG. 8, the user system 712 includes a processor system 812A, a memory system 812B, an input system 812C, and an output system 812D. The processor system 812A can include any suitable combination of one or more processors. The memory system 812B can include any suitable combination of one or more memory devices. The input system 812C can include any suitable combination of input devices, such as one or more touchscreen interfaces, keyboards, mice, trackballs, scanners, cameras, or interfaces to networks. The output system 812D can include any suitable combination of output devices, such as one or more display devices, printers, or interfaces to networks.

In FIG. 8, the network interface 720 of FIG. 7 is implemented as a set of HTTP application servers 8001-800N. Each application server 800, also referred to herein as an "app server," is configured to communicate with tenant database 722 and the tenant data 823 therein, as well as system database 724 and the system data 825 therein, to serve requests received from the user systems 812. The tenant data 823 can be divided into individual tenant storage spaces 813, which can be physically or logically arranged or divided. Within each tenant storage space 813, tenant data 814 and application metadata 816 can similarly be allocated for each user. For example, a copy of a user's most recently used (MRU) items can be stored to tenant data 814. Similarly, a copy of MRU items for an entire organization that is a tenant can be stored to tenant storage space 813.

The process space 728 includes system process space 802, individual tenant process spaces 804 and a tenant management process space 810. The application platform 718 includes an application setup mechanism 838 that supports application users' creation and management of applications. Such applications and others can be saved as metadata into tenant database 722 by save routines 836 for execution by subscribers as one or more tenant process spaces 804 managed by tenant management process 810, for example. Invocations to such applications can be coded using PL/SOQL 834, which provides a programming language style interface extension to API 832. Invocations to applications can be detected by one or more system processes, which manage retrieving application metadata 816 for the subscriber making the invocation and executing the metadata as an application in a virtual machine.

The system 716 of FIG. 8 also includes a user interface (UI) 830 and an application programming interface (API) 832 to system 716 resident processes to users or users at user systems 812. In some other implementations, the environment 710 may not have the same elements as those listed above or may have other elements instead of, or in addition to, those listed above.

Each application server 800 can be communicably coupled with tenant database 722 and system database 724, for example, having access to tenant data 823 and system data 825, respectively, via a different network connection. For example, one application server 800₁ can be coupled via the network 714 (for example, the Internet), another application server 800N can be coupled via a direct network link, and another application server (not illustrated) can be coupled by yet a different network connection. Transfer Control Protocol and Internet Protocol (TCP/IP) are examples of typical protocols that can be used for communicating between application servers 800 and the system 716. However, it will be apparent to one skilled in the art that other transport protocols can be used to optimize the system 716 depending on the network interconnections used.

In some implementations, each application server 800 is configured to handle requests for any user associated with any organization that is a tenant of the system 716. Because it can be desirable to be able to add and remove application servers 800 from the server pool at any time and for various reasons, in some implementations there is no server affinity for a user or organization to a specific application server 800. In some such implementations, an interface system implementing a load balancing function (for example, an F5 Big-IP load balancer) is communicably coupled between the application servers 800 and the user systems 812 to distribute requests to the application servers 800. In one implementation, the load balancer uses a least-connections algorithm to route user requests to the application servers 800. Other examples of load balancing algorithms, such as round robin and observed-response-time, also can be used. For example, in some instances, three consecutive requests from the same user could hit three different application servers 800, and three requests from different users could hit the same application server 800. In this manner, by way of example, system 716 can be a multi-tenant system in which system 716 handles storage of, and access to, different objects, data and applications across disparate users and organizations.

In one example storage use case, one tenant can be a company that employs a sales force where each salesperson uses system 716 to manage aspects of their sales. A user can maintain contact data, leads data, customer follow-up data, performance data, goals and progress data, etc., all applicable to that user's personal sales process (for example, in tenant database 722). In an example of an MTS arrangement, because all of the data and the applications to access, view, modify, report, transmit, calculate, etc., can be maintained and accessed by a user system 812 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 716 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 716 also can maintain system level data usable by multiple tenants or other data. Such system level data can include industry reports, news, postings, and the like that are sharable among tenants.

In some implementations, the user systems 812 (which also can be client systems) communicate with the application servers 800 to request and update system-level and tenant-level data from the system 716. Such requests and updates can involve sending one or more queries to tenant database 722 or system database 724. The system 716 (for example, an application server 800 in the system 716) can automatically generate one or more SQL statements (for example, one or more SQL queries) designed to access the desired information. System database 724 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9:
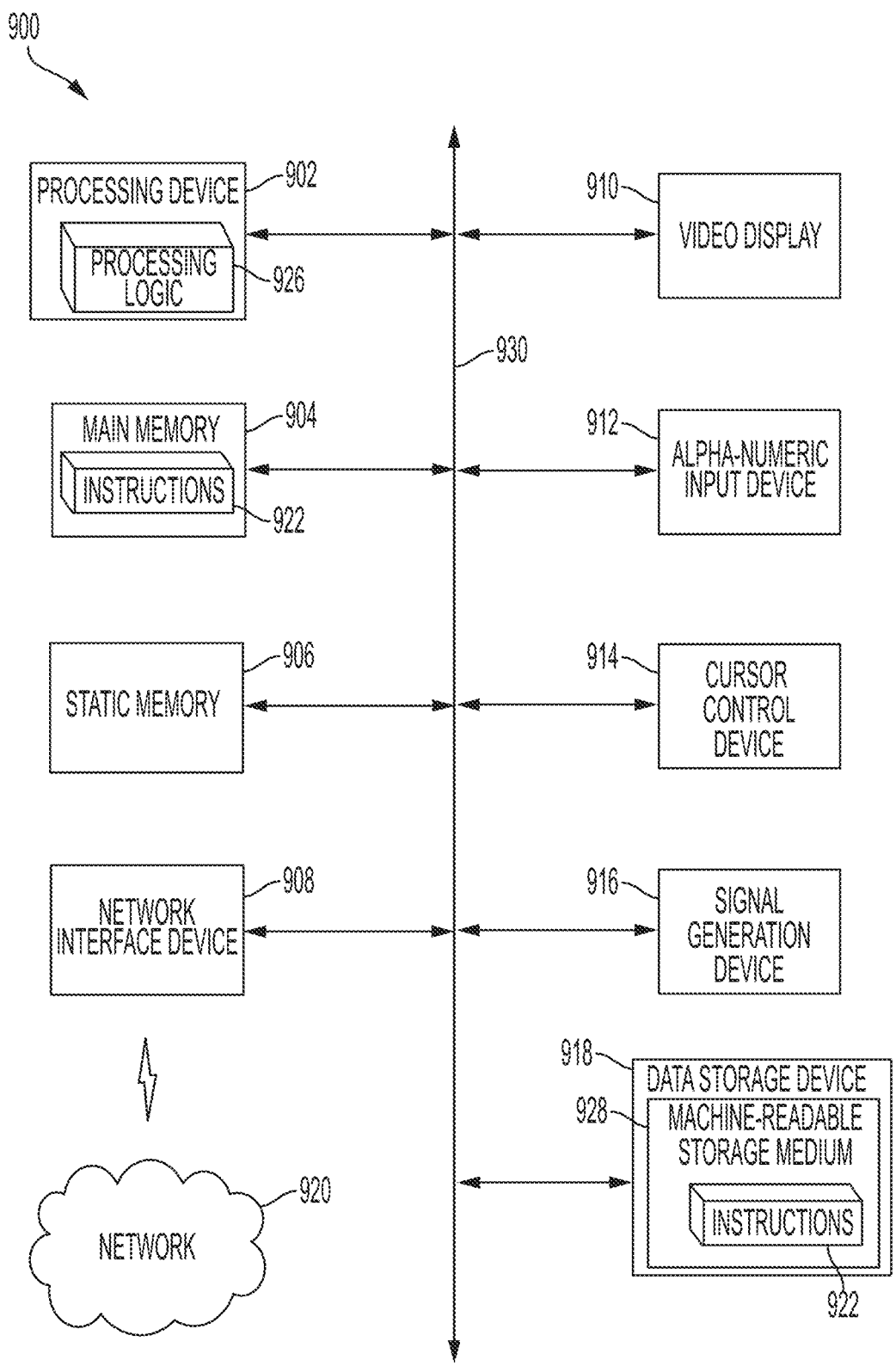
FIG. 9 is a diagrammatic representation of a machine in an exemplary form of a computer system within which a set of instructions, for causing the machine to perform any one or more of the methodologies discussed herein, may be executed.

FIG. 9 illustrates a diagrammatic representation of a machine in the exemplary form of a computer system 900 within which a set of instructions for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In at least one embodiment, computer system 900 may represent, for example, elements of the cloud-based computing platform or any other elements of FIG. 1 (e.g. clients, computing systems used by the customers 150, the third-party application exchange 160) or any elements of FIGS. 6 through 8, etc.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of in-memory buffer service 94) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general-purpose digital computer, by using a special-purpose computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, at least one embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiments. It should be understood that various changes can be made in the function and arrangement of elements without departing from the scope defined by the claims, which includes known equivalents and foreseeable equivalents at the time of filing this patent application.

What is claimed is:

1. A method for defining feature variable configurations in a system defined by a codebase, the method comprising:
   executing the codebase over a set of test cases configured to test a first plurality of software feature behaviors of a first software feature;
   logging feature variable configurations generated by the test cases, the feature variable configurations comprising feature variables;
   identifying associations between the feature variables and individual software feature behaviors of the first plurality of software feature behaviors based on the logged feature variable configurations;
   calculating impact scores for the feature variables in association with the corresponding individual software feature behavior based on an occurrence of the identified associations between the feature variables and the individual software feature behaviors;
   identifying at least one deterministic feature variable for association with the corresponding individual software feature behaviors of the first plurality of software feature behaviors based on the calculated impact scores for the feature variables associated with the corresponding individual software feature behaviors;
   identifying at least one common feature variable from the at least one deterministic feature variable associated with the corresponding individual software feature behaviors of the first plurality of software feature behaviors, the at least one common feature variable being operable to enable access to the first software feature in the system; and
   updating at least one platform license definition including the first software feature to define the at least one common feature variable as enabling access to the first software feature.

2. The method of claim 1, further comprising updating at least one platform license definition including the first software feature to define the at least one deterministic feature variable associated with a first software feature behavior of the first plurality of software behaviors as enabling access to the first software feature behavior.

3. The method of claim 1, wherein logging the feature variable configurations generated by the plurality of test cases comprises logging flow relationships between the feature variables.

4. The method of claim 3, further comprising generating a system graph defining boundaries for a plurality of software features of the system, the plurality of software features including the first software feature, wherein a first boundary for the first software feature in the system graph is defined by the at least one deterministic variable associated with the first plurality of software feature behaviors and the flow relationships between the at least one deterministic variable.

5. The method of claim 1, further comprising:
   committing at least one code change to the codebase; and
   executing the codebase including the at least one code change over the set of test cases.

6. The method of claim 1, wherein the method is incorporated into a continuous integration/continuous deployment (CI/CD) pipeline.

7. The method of claim 1, wherein calculating impact scores for the feature variables in association with the corresponding individual software feature behavior based on an occurrence of the identified associations between the feature variables and the individual software feature behaviors comprises calculating a first impact score for a first feature variable in association with a first software feature behavior using one of a statistical probability model, a linear regression model, and a percentage model.

8. A system for defining feature variable configurations in a system defined by a codebase, the system comprising:
at least one processor; and
at least one non-transitory machine-readable storage medium that stores instructions configurable to be executed by the at least one processor to:
execute the codebase over a set of test cases configured to test a first plurality of software feature behaviors of a first software feature;
log feature variable configurations generated by the test cases, the feature variable configurations comprising feature variables;
identify associations between the feature variables and individual software feature behaviors of the first plurality of software feature behaviors based on the logged feature variable configurations;
calculate impact scores for the feature variables in association with the corresponding individual software feature behavior based on an occurrence of the identified associations between the feature variables and the individual software feature behaviors;
identify at least one deterministic feature variable for association with the corresponding individual software feature behaviors of the first plurality of software feature behaviors based on the calculated impact scores for the feature variables associated with the corresponding individual software feature behaviors;
identify at least one common feature variable from the at least one deterministic feature variable associated with the corresponding individual software feature behaviors of the first plurality of software feature behaviors, the at least one common feature variable being operable to enable access to the first software feature in the system; and
update at least one platform license definition including the first software feature to define the at least one common feature variable as enabling access to the first software feature.

9. The system of claim 8, wherein the instructions are configurable to be executed by the at least one processor to: update the at least one platform license definition including the first software feature to define the at least one deterministic feature variable associated with a first software feature behavior of the first plurality of software behaviors as enabling access to the first software feature behavior.

10. The system of claim 8, wherein the instructions are configurable to be executed by the at least one processor to log the feature variable configurations generated by the plurality of test cases, the feature variable configurations comprising flow relationships between the feature variables.

11. The system of claim 10, wherein the instructions are configurable to be executed by the at least one processor to generate a system graph defining boundaries for a plurality of software features of the system, the plurality of software features including the first software feature, wherein a first boundary for the first software feature in the system graph is defined by the at least one deterministic variable associated with the first plurality of software feature behaviors and the flow relationships between the at least one deterministic variable.

12. The system of claim 8, wherein the instructions are configurable to be executed by the at least one processor to:
commit at least one code change to the codebase; and
execute the codebase including the at least one code change over the set of test cases.

13. The system of claim 8, wherein the instructions are configurable to be executed by the at least one processor to calculate impact scores for the feature variables in association with the corresponding individual software feature behavior based on an occurrence of the identified associations between the feature variables and the individual software feature behaviors comprises calculating a first impact score for a first feature variable in association with a first software feature behavior using one of a statistical probability model, a linear regression model, and a percentage model.

14. A non-transitory machine-readable storage medium that stores instructions executable by at least one processor, the instructions configurable to cause the at least one processor to perform operations comprising:
executing the codebase over a set of test cases configured to test a first plurality of software feature behaviors of a first software feature;
logging feature variable configurations generated by the test cases, the feature variable configurations comprising feature variables;
identifying associations between the feature variables and individual software feature behaviors of the first plurality of software feature behaviors based on the logged feature variable configurations;
calculating impact scores for the feature variables in association with the corresponding individual software feature behavior based on an occurrence of the identified associations between the feature variables and the individual software feature behaviors;
identifying at least one deterministic feature variable for association with the corresponding individual software feature behaviors of the first plurality of software feature behaviors based on the calculated impact scores for the feature variables associated with the corresponding individual software feature behaviors;
identifying at least one common feature variable from the at least one deterministic feature variable associated with the corresponding individual software feature behaviors of the first plurality of software feature behaviors, the at least one common feature variable being operable to enable access to the first software feature in the system; and
updating at least one platform license definition including the first software feature to define the at least one common feature variable as enabling access to the first software feature.

15. The non-transitory machine-readable storage medium of claim 14, wherein the instructions are configurable to cause the at least one processor to further perform operations comprising:
updating the at least one platform license definition including the first software feature to define the at least one deterministic feature variable associated with a first software feature behavior of the first plurality of software behaviors as enabling access to the first software feature behavior.

16. The non-transitory machine-readable storage medium of claim 14, wherein the instructions are configurable to cause the at least one processor to further perform operations comprising logging the feature variable configurations generated by the plurality of test cases, the feature variable configurations comprising flow relationships between the feature variables.

17. The non-transitory machine-readable storage medium of claim 16, wherein the instructions are configurable to cause the at least one processor to further perform operations comprising generating a system graph defining boundaries for a plurality of software features of the system, the plurality of software features including the first software feature, wherein a first boundary for the first software feature in the system graph is defined by the at least one deterministic variable associated with the first plurality of software feature behaviors and the flow relationships between the at least one deterministic variable.

18. The non-transitory machine-readable storage medium of claim 14, wherein the instructions are configurable to cause the at least one processor to further perform operations comprising:
   committing at least one code change to the codebase; and
   executing the codebase including the at least one code change over the set of test cases.

19. The non-transitory machine-readable storage medium of claim 14, wherein the instructions are configurable to cause the at least one processor to further perform operations comprising calculating impact scores for the feature variables in association with the corresponding individual software feature behavior based on an occurrence of the identified associations between the feature variables and the individual software feature behaviors comprises calculating a first impact score for a first feature variable in association with a first software feature behavior using one of a statistical probability model, a linear regression model, and a percentage model.

* * * * *